Patented Mar. 19, 1946

2,396,641

UNITED STATES PATENT OFFICE 2,396,641

CONVERSION OF HYDROCARBON OILS

Gerald C. Connolly, Baton Rouge, La., assignor to Standard Oil Development Company, a corporation of Delaware No Drawing. Application May 4, 1943,
Serial No. 485,643

2 Claims. (Cl. 196—52)

This invention relates to the conversion of hydrocarbon oils and pertains more particularly to the cracking of such oils in the presence of a particular type of catalyst.

The primary object of the present invention is to provide a process for cracking oils capable of producing a gasoline of improved quality.

Another object of the invention is to provide a process for cracking oils and a catalyst therefor capable of producing a gas having a relatively high concentration of butanes, butenes and other higher molecular weight hydrocarbons.

It has been found that a catalyst comprising alumina and tungsten oxide is not only capable of producing a relatively high yield of gasoline but that the gasoline produced therefrom contains a relatively greater proportion of aromatics than gasolines produced in the presence of cracking catalysts now in common use.

It has also been found that this type of catalyst produces a substantial yield of gases having a relatively high density, indicating a relatively high concentration of $C_3$ and $C_4$ hydrocarbons.

The tungsten oxide-alumina catalyst employed for cracking oils may be prepared in a number of different ways. One method found to be particularly effective is to impregnate a hydrous oxide of alumina, such as, for example, alumina hydrogel or wet gelatinous precipitate of alumina, with a solution containing a salt of tungsten such as ammonium tungstate or ammonium thio-tungstate. The amount of tungsten absorbed by impregnation can be controlled by regulating the concentration of the impregnating solution. The impregnated product after draining and drying may be further heated to decompose the salt into the oxide.

Another convenient method of preparation is to form a plural gel of tungsten oxide and aluminum oxide. For example, an ammonium thio-tungstate solution may be reacted with a hydrolyzable salt of aluminum in acid solution. If the hydrogen ion concentration is maintained substantially neutral or only slightly acid, a somewhat cloudy plural hydrosol containing colloidal aluminum oxide and tungstic oxide may be formed which upon standing will set into a hydrogel. This product after being carefully dried at relatively low temperature, such as below 200° F., for a period sufficient to remove most of the imbibed water may then be activated by heating slowly to 800° F. and holding this temperature for from 2 to 4 hours. The resulting dry gel forms a good catalyst.

In lieu of forming a true plural gel, co-gelatinous precipitates of alumina and tungsten oxide may be employed. Such gelatinous precipitates may be formed immediately by maintaining the solution strongly acid during reaction between the ammonium thio-tungstate and hydrolyzable salt of alumina.

A further method of preparation is to add one of the components during formation of the hydrosol of the other component before setting into the hydrogel. For example, alumina in various forms such as purified bauxite, Activated Alumina, alumina dry gel, hydrogel, or the like may be added during formation of tungstic oxide gel, hydrosol or hydrogel.

The present invention in its broader phases is not restricted to any particular method of producing the composite gel of tungstic oxide-alumina and various other methods of preparation will be apparent to those skilled in the art. It is important, however, to so prepare and combine the constituents that the resulting product has an adsorptive or gel structure.

The relative proportions of tungstic oxide and alumina present in the catalyst may vary over a considerable range. For example, the amount of tungstic oxide may range from 5% to 50%. In most cases it is preferred to employ a catalyst containing from 10% to 30% of tungstic oxide.

While I have described the catalyst as comprising tungstic oxide and alumina as the principal constituents, it will be understood that the invention does not preclude the presence of other constituents in minor amounts which may be added as activators, stabilizers, promoters, and for other purposes.

The following examples may be helpful in gaining a better understanding of the invention, it being understood that these examples are illustrative rather than limitive.

A gelatinous precipitate of alumina was first prepared by first combining a 10% solution of aluminum sulphate $(Al_2(SO_4)_3.15H_2O)$ with a normal solution of ammonium hydroxide while stirring at room temperature, the ammonium hydroxide being in a slight excess.

Separate portions of the washed gelatinous alumina were impregnated with salts of group VI metals capable of being decomposed into the corresponding oxides. The concentration of the salt solutions was controlled to form about 10% of the group VI metal oxides in the final catalyst. Following the impregnation of the alumina with the group VI salt solutions, the products were drained and slowly dried, after which they were heated to a temperature of about 800° F. to convert the salts into the corresponding oxides. The resulting products were then ground, pilled, and activated at a temperature of 850° F. for several hours.

These catalysts were then tested to determine their cracking activity by passing an East Texas gas oil having an A. P. I. gravity of about 33.8° in vapor form through a cracking zone containing said catalyst at a rate of about 0.6 volume of liquid feed per volume of catalyst per hour. The cracking zone was maintained at a temperature of about 850° F. and the length of the cracking period was two hours. The results of these tests are set forth in the following table:

| Base | Metal oxide | Percent oxide | Rejected gas | | Liquid product | |
|---|---|---|---|---|---|---|
| | | | Volume-liters per 100 gms. product | Density air=1 | Gravity | Volume percent 400° F. gasoline |
| Dry Al$_2$O$_3$ | | | 15.5 | 0.41 | 34.5 | 16.5 |
| Do | WO$_3$ | 10 | 19.8 | .48 | 38.3 | 29.5 |
| Do | Cr$_2$O$_3$ | 10 | 40.4 | .25 | 32.1 | 16.5 |
| Do | MoO$_3$ | 10 | 37.6 | .22 | 32.5 | 10.5 |
| Do | UO$_3$ | 10 | 12.9 | .37 | 35.6 | 12.5 |

From the above table it will be apparent that the catalyst containing the tungsten oxide produced a relatively high yield of gasoline. It will also be observed from the above table that the chromium oxide contained on the alumina did not increase the yield of gasoline over that obtained by the use of the aluminum oxide alone and that the remaining two group VI oxides, namely, molybdenum oxide and uranium oxide, actually reduced the amount of gasoline produced as compared with that obtained by the alumina base. It is also apparent from the above table that the chromium oxide and molybdenum oxide produce a gas of relatively low density as compared with that produced when cracking the oils in the presence of the alumina base or the alumina base containing the tungsten oxide.

Another catalyst was prepared by first precipitating alumina from aluminum sulphate solution with ammonia, as previously described. The resulting product after being thoroughly washed was then slowly dried. The dried product was then treated with a solution of ammonium thio-tungstate of a concentration sufficient to form about 20% of tungsten oxide on the dried product. Following this, the product was heated to a temperature of about 800° F. to decompose the tungstate into tungsten oxide. The resulting product in molded form was then tested under conditions above described and yielded about 33% gasoline and 46 liters of gas per 100 grams of liquid product, the density of the gas being 0.46. The distillate product obtained had an aniline point of 70 and a bromine number of 70. The aniline point of the product obtained from cracking in the presence of a silica-alumina catalyst under the same set of conditions was about 95 or higher, thus indicating that the product obtained from the alumina-tungsten oxide catalyst contains a higher percentage of aromatic constituents than those obtained from silica-alumina catalyst.

The same catalyst when tested at 950° F. and at a feed rate of 0.6 volume of oil per hour per volume of catalyst with Tinsley gas oil which is of paraffinic nature gave a 44% yield of liquid products distributed as shown in the following table:

| | Cut | | | | |
|---|---|---|---|---|---|
| | 1 | 2 | 3 | 4 | Bottoms |
| Boiling range °F | −50 | 50–105 | 105–250 | 250–325 | |
| Yield volume percent | 1.7 | 3.2 | 13.5 | 23.5 | 58.1 |
| Aromatics do | 0 | 0 | 62 | 88 | |

The 50–325° F. cut had an aniline point (extrapolated) of −51° F. and contained 74 volume per cent aromatics as determined by optical methods. The gas obtained from the cracking operation had the following analysis:

| | Per cent |
|---|---|
| Hydrogen | 63 |
| C$_1$ | 11 |
| C$_2$ | 6 |
| C$_3$ | 8 |
| Butenes | 3 |
| Butanes | 5 |
| C$_{5+}$ | 4 |

The 74% concentration of aromatics in the 50–325° F. aviation fraction is much higher than is obtained with other types of catalysts. For example, high-grade synthetic silica alumina catalysts which are used on a large scale for the production of aviation gasoline by catalytic cracking generally give considerably less than 50% of aromatics in the same fraction. The higher aromatic content is extremely valuable for increasing the rich mixture performance of the aviation fraction.

I am aware that it has been previously proposed to treat low-molecular weight hydrocarbons, such as naphthas, butanes and the like, with catalysts comprising group VI oxides supported on alumina, and particularly chromium and molybdenum oxides, for the purpose of effecting dehydrogenation of said hydrocarbons into olefins or to effect dehydro-aromatization of said hydrocarbons.

I am also aware that it has been previously proposed to utilize tungsten oxides or tungsten sulphides supported on carriers such as alumina for effecting hydrogenation of oils in the presence of added hydrogen. It has also been proposed to crack oils in the presence of added hydrogen with a catalyst of similar composition. However, as far as I am aware, it has not been previously known that catalysts comprising alumina and tungsten oxide form active cracking catalysts in the absence of extraneous hydrogen.

This application forms a continuation-in-part of my earlier application Serial No. 273,888, filed May 16, 1939.

Having described the specific embodiment of the invention, it will be understood that it embraces such other variations and modifications as come within the spirit and scope thereof.

I claim:

1. A process for cracking higher boiling hydrocarbons to form lower boiling hydrocarbons suitable for motor fuel which comprises passing the oil to be cracked in vapor state and in the absence of added hydrogen through a cracking zone containing a catalyst consisting of a major portion of alumina and a minor portion of tungsten oxide, and maintaining said oil vapors within said cracking zone at a temperature and for a period sufficient to effect a substantial conversion of said oil into lower boiling hydrocarbons.

2. A process for cracking higher boiling hydrocarbons into lower boiling hydrocarbons suitable for motor fuel which comprises passing said oil in vapor state and in the absence of extraneous hydrogen through a cracking zone containing a catalyst consisting of a major portion of alumina and a minor portion of between about 10% and 30% of tungsten oxide, and maintaining said oil in contact with said catalyst within said cracking zone at a temperature and for a period sufficient to convert a substantial portion of said oil into lower boiling hydrocarbons.

GERALD C. CONNOLLY.